(12) United States Patent
Theissler et al.

(10) Patent No.: US 8,001,991 B2
(45) Date of Patent: Aug. 23, 2011

(54) VENT VALVE FOR THE FUEL TANK OF A MOTOR VEHICLE

(75) Inventors: Jürgen Theissler, Ansbach (DE); Richard Roscher, Langenaltheim (DE)

(73) Assignee: Alfmeier Prazision Ag Baugruppen und Systemlosungen, Treuchtlingen (DE)

( * ) Notice: Subject to any disclaimer, the term of this patent is extended or adjusted under 35 U.S.C. 154(b) by 884 days.

(21) Appl. No.: 11/869,846

(22) Filed: Oct. 10, 2007

(65) Prior Publication Data
US 2008/0092962 A1 Apr. 24, 2008

(30) Foreign Application Priority Data
Oct. 10, 2006 (DE) .......................... 10 2006 048 183

(51) Int. Cl.
*F16K 24/04* (2006.01)
(52) U.S. Cl. ..................................... 137/202
(58) Field of Classification Search .................... 137/39, 137/43, 587, 177, 197, 199, 202; 285/305, 285/322, 921
See application file for complete search history.

(56) References Cited

U.S. PATENT DOCUMENTS

| 5,511,577 | A * | 4/1996 | Richards et al. .............. 137/202 |
| 5,605,175 | A | 2/1997 | Bergsma et al. |
| 6,206,057 | B1 | 3/2001 | Benjey et al. |
| 7,147,017 | B2 * | 12/2006 | Leonhardt ..................... 141/198 |
| 2005/0126633 | A1 | 6/2005 | Leonhardt |

OTHER PUBLICATIONS

European Search Report and Opinion with Machine Translation—5 pgs.

* cited by examiner

*Primary Examiner* — Craig Schneider
(74) *Attorney, Agent, or Firm* — Dority & Manning, P.A.

(57) ABSTRACT

A vent valve for a fuel tank of a motor vehicle includes a housing, a cage in the housing, a movable float, and a sealing arrangement with an at least three-stage reopening operation. The sealing arrangement includes multiple movable supports defining openings of varying cross-sectional area sequentially operable.

11 Claims, 8 Drawing Sheets

FIG. 11

VENT VALVE FOR THE FUEL TANK OF A MOTOR VEHICLE

TECHNICAL FIELD

The invention relates to a vent valve for the fuel tank of a motor vehicle. Such a valve serves, for example, to ensure an aeration and venting of the tank during the operation of the vehicle, or to limit the fill level of fuel during fueling.

BACKGROUND

Valves for the latter use are also known as fill limit vent valves (FLVV). They have a float that is directly or indirectly connected to a sealing arrangement which seals a valve housing vent opening, connected with the environment, for example, when during fueling the fuel level has reached a predetermined height. A problem with this type of valve is that during the operation of the vehicle the float can be lifted by fuel splashing up, and the vent opening of the valve can be sealed. Thereby, due to vaporizing fuel, an internal pressure can build up exerting a force on the sealing arrangement, which in the simplest case is a disk of elastomer material, the force exceeding the weight of the float, such that the vent opening remains closed at least for a certain duration. Thus, the danger exists of the tank being damaged by the internal pressure.

To reduce this danger, among others, two-stage valves are used. In these valves, known, for example, from US 2005/0126633 A1, a sealing arrangement is present, in which initially a smaller opening cross-section is released, which due to the smaller surface upon which the internal pressure can act, requires a lower force expenditure. The internal pressure can be reduced until the weight of the float is sufficient to remove the sealing arrangement from a second, larger opening cross-section that corresponds, for example, approximately to the cross-sectional area of the vent opening. Because the first opening cross-section cannot be selected to be too large, in order to enable the opening of the first stage during greater internal pressures, it takes a relatively long time until the internal pressure is reduced to a value that permits the opening of the second valve stage.

SUMMARY

An objective of the disclosure is to propose a vent valve, which is improved with respect to its re-opening behavior after a closure of the vent opening caused by a pressure inside the tank.

This objective and others are attained by a vent valve such as a FLVV which comprises at least a three-stage sealing arrangement. Thereby, in general, a faster re-opening is possible. Thus, a first stage can be provided with a relatively small opening cross-section, which opens with high pressures inside the tank. Because, however, at least two further valve stages are provided, depending on the design and the number of the stages, an opening of the next stage occurs after a short time, such that the decrease in pressure is further accelerated due to the respectively larger opening cross-section.

A sealing arrangement may include multiple supports, arranged one after the other along the central longitudinal axis, where said supports, are each penetrated by a through channel running coaxially to the central longitudinal axis. A sealing element is arranged on each support, coaxially to the central longitudinal axis, both on the upper sides facing towards the vent opening, and on the lower sides facing the float. It would be conceivable thereby that the supports and the sealing elements present thereon are formed as one piece, for example, formed as an injection molded part. Preferably, however, the sealing elements are separate parts which in view of their sealing function are composed, for example, of a soft and elastic material.

The supports are movable, in each case, relative to each other and relative to the float, in the direction of the central longitudinal axis of the valve housing, by a predetermined distance between a closed position and an open position. In this way, it is guaranteed that the supports and their sealing elements can be removed from each other in a chronological sequence (open position) and—with floats rising upwards—can be again brought close to each other, and finally pressed against each other, the uppermost support closing the vent opening (closed position). In the each case of the closed position of a support, the sealing element on the upper side thereof bears against the sealing element on the lower side of an adjacent support, and in the case of the uppermost support lying nearest to the vent opening, the sealing element on the upper side thereof bears against a counter-sealing element, this being a lower-side sealing element of a support or a sealing element encompassing the vent opening. Thereby, in each case, two sealing elements cooperate to surround an opening having a cross-section. The size of the respective opening cross-sections following one another, which ultimately represent the individual stages of the valve, decreases towards the float, the gradation of the individual opening cross-sections permitting a large range with regards to the opening characteristics of the valve.

Sealing elements interacting with each other can, in principle, be formed arbitrarily. Thus, it is conceivable for instance, that a sealing element is a two-dimensional seat, or also a seat formed in the shape of a ring projection, and that a sealing element interacting therewith is a ring-shaped sealing lip or a sealing ring having a level sealing area. It is critical only that a sealing element pair interacts such that an opening cross-section is surrounded in a sealing manner.

BRIEF DESCRIPTION OF THE DRAWINGS

Further advantageous embodiments are explained in more detail in the following description, which refers to the attached drawings. They show.

DETAILED DESCRIPTION

Detailed reference will now be made to the drawings in which examples embodying the present invention's various aspects will be shown. The detailed description uses numerical and letter designations to refer to features in the drawings. Like or similar designations in the drawings and description refer to like or similar parts.

A vent valve according to the disclosure, valve 1 for short, comprises, for example, a cylindrical housing 2, on the underside of which a base 3 is molded, and which on its upper side is closed with a cover 4. At an approximately central position, the cover 4 has a connection piece 5, which defines a vent opening 6. On the cover 4, a flange 7 is attached, with which the valve 1 can be fixed to an upper tank wall. The housing 2 thereby extends through a tank opening into the interior of the tank. The flange 7 has a connection 8, with which a vent line can be connected. A ventilation channel 9, which is connected with the vent opening 6, passes through the connection 8. A gas-tight seal is attained between the connection piece 5 of the cover 4 and the flange 7 using an O-ring 10, which is inserted in a peripheral groove 11 of the connection piece 5.

A cage 12, having an approximately cylindrical peripheral wall (12a), is molded onto the underside of the cover 4, where the underside of the cage is open and receives a sealing arrangement 13 (or 70 in the case of FIGS. 8-11) in an axially movable manner. The sealing arrangement 13 (also 70) is connected with a float 14, which is movable in the direction of the central longitudinal axis 15 of the housing 2. The float 14 has a hollow interior and a central peg 16 that extends approximately to the lower end of the float, where the peg is held in a guide sleeve 17 in an axially movable manner. The guide sleeve 17 is molded onto the base 3, the interior of the guide sleeve being connected via an opening 18 in the base with the interior of the tank. Approximately plate-shaped ribs 19 protrude radially inwards from the inner wall of the float 14. A helical compression spring 20 is arranged within the central space of the float surrounded by the ribs 19, where the helical compression spring acts upon the float 14 with a force directed upwards, i.e., towards the vent opening 6. The float 14 has an upper longitudinal section 22 with a reduced diameter. A flange 23, projecting radially outwards, is molded onto the face side of the longitudinal section 22, where the under side of the flange has a stop face 24 running approximately in a radial plane (radial with respect to the central longitudinal axis 15).

Figure 4:
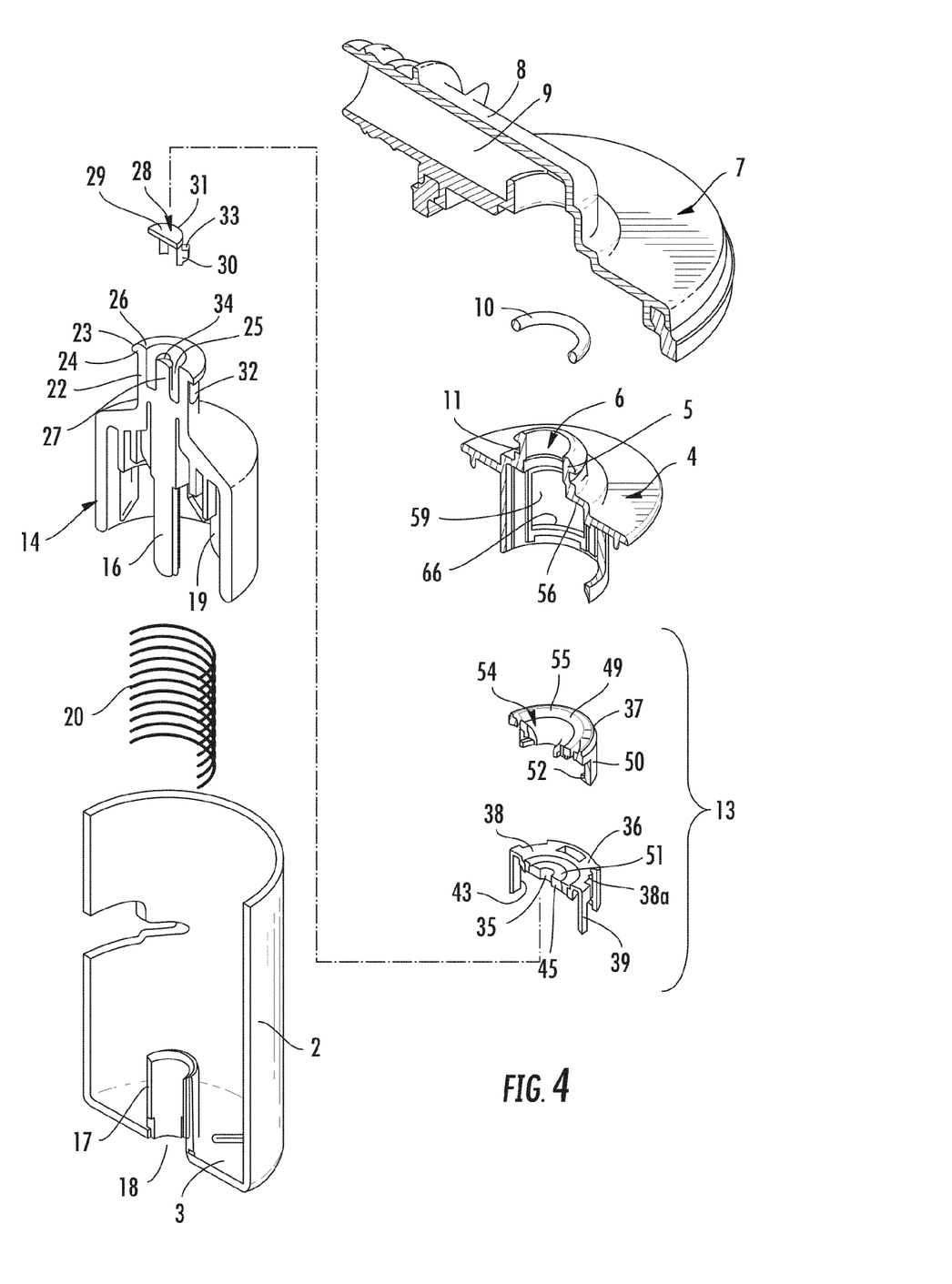
Figure 5:
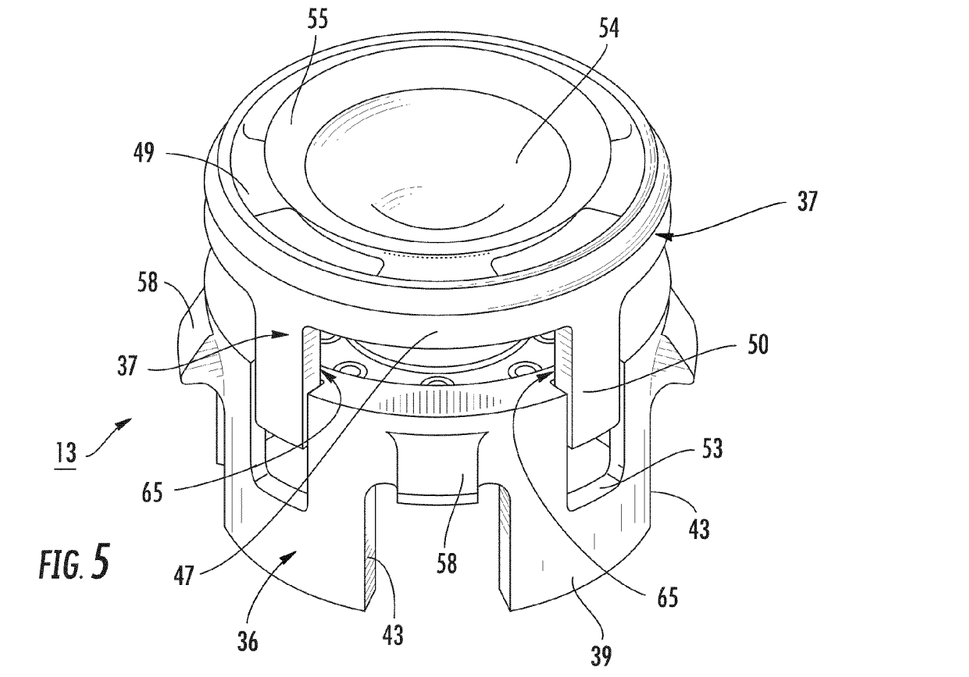
Figure 6:
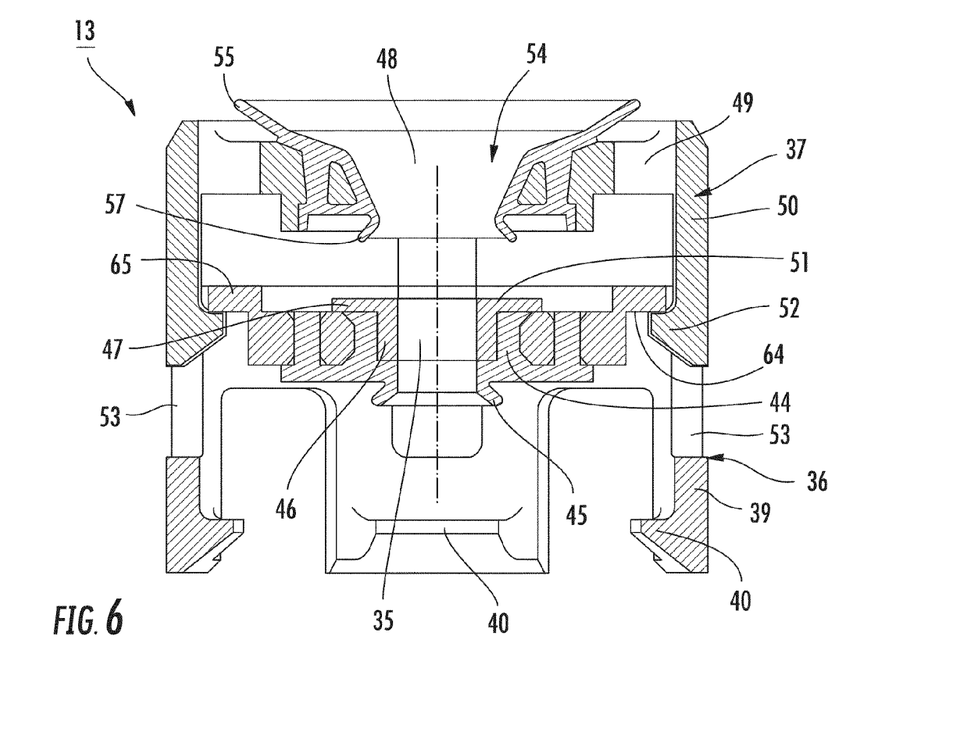
Figure 7:
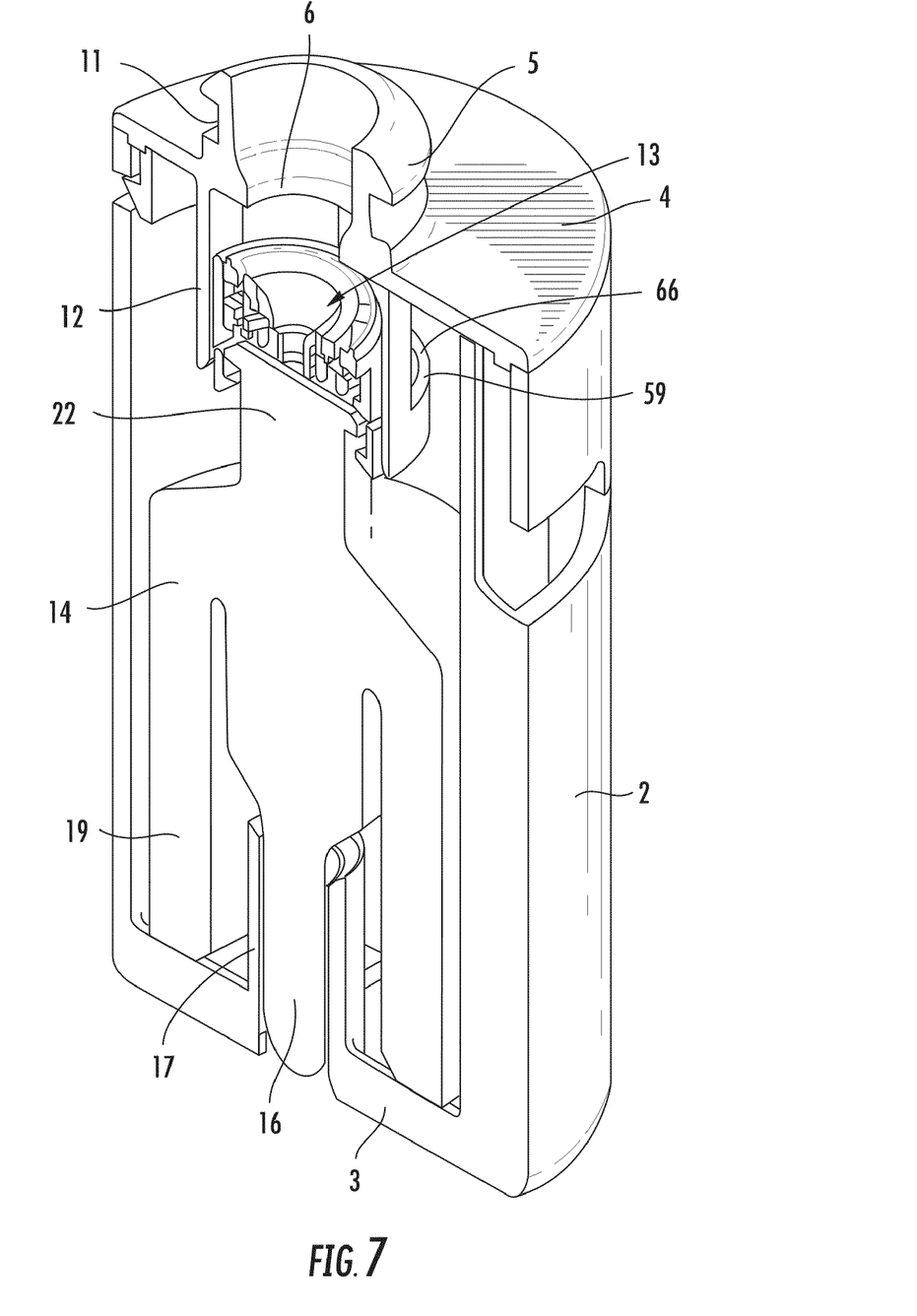
Figure 8:
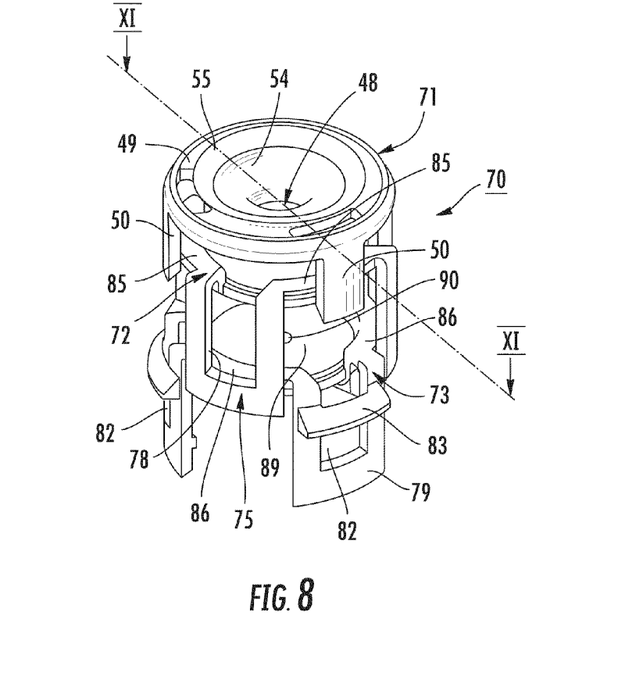
Figure 9:
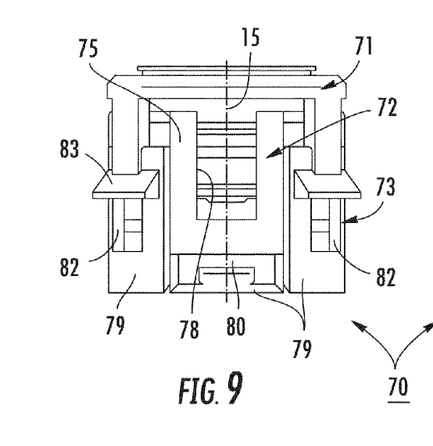
Figure 10:
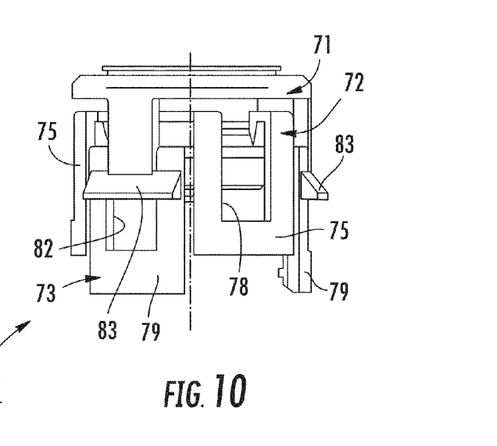
Figure 11:
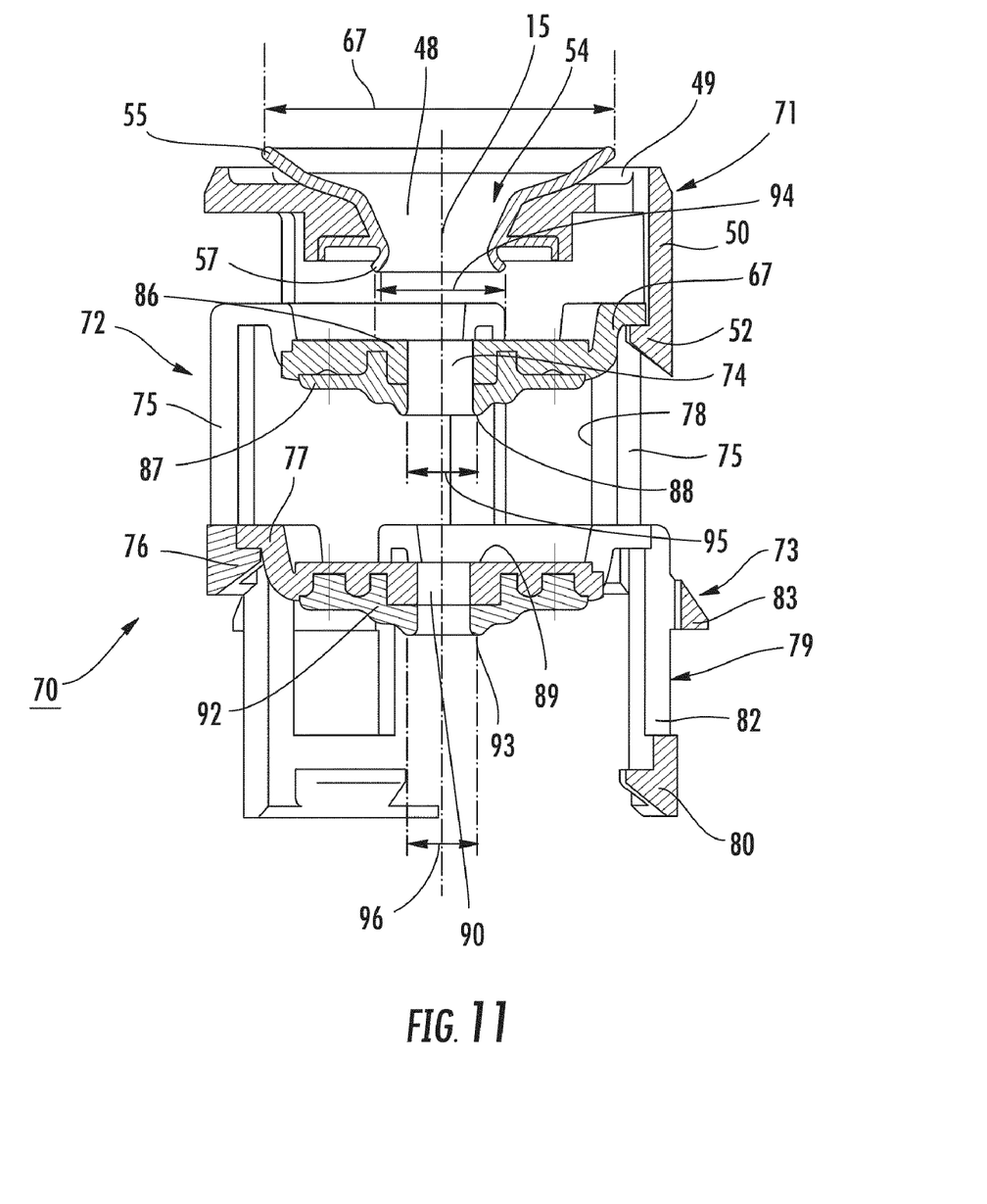

In the face side 26 of the longitudinal section 22, there is a central recess 25 from the base of which a peg 27, which is arranged coaxially to the central longitudinal axis 15, extends outward in the axial direction. The peg 27 ends at an axial distance before the face side 26 of the longitudinal section 22. The recess 25 is ring-shaped, in cross-section or viewed from the top, due to the presence of the peg 27. A sealing element 28 is arranged in the recess 25. This is formed, for example, by a circular disk-shaped plate 29 and several webs 30. The webs 30 are arranged on the underside, or on the side of the plate 29 facing away from the vent opening 6, and are uniformly distributed over its perimeter. The webs 30 are radially broadened and project to a certain extent beyond the edge 31 of the plate 29. The webs 30 are arranged in the ring-shaped recess 25. The plate 29 bears with its underside against the peg 27. The webs 30 extend, in each case, into a window 32 (FIG. 4) assigned to them in the longitudinal section 22. The windows 32 extend in the direction of the central longitudinal axis 15, which results in a certain axial mobility of the sealing element 28. The webs 30 have a stop face 33, running approximately in a radial plane, which stop face interacts with the upper edge region 34 (FIG. 4) of a window 32. Furthermore, the sealing element 28 is guided in the recess 25 with a certain radial play, such that the plate 29 can easily tilt or adopt an oblique position relative to the central longitudinal axis 15.

Figure 1:
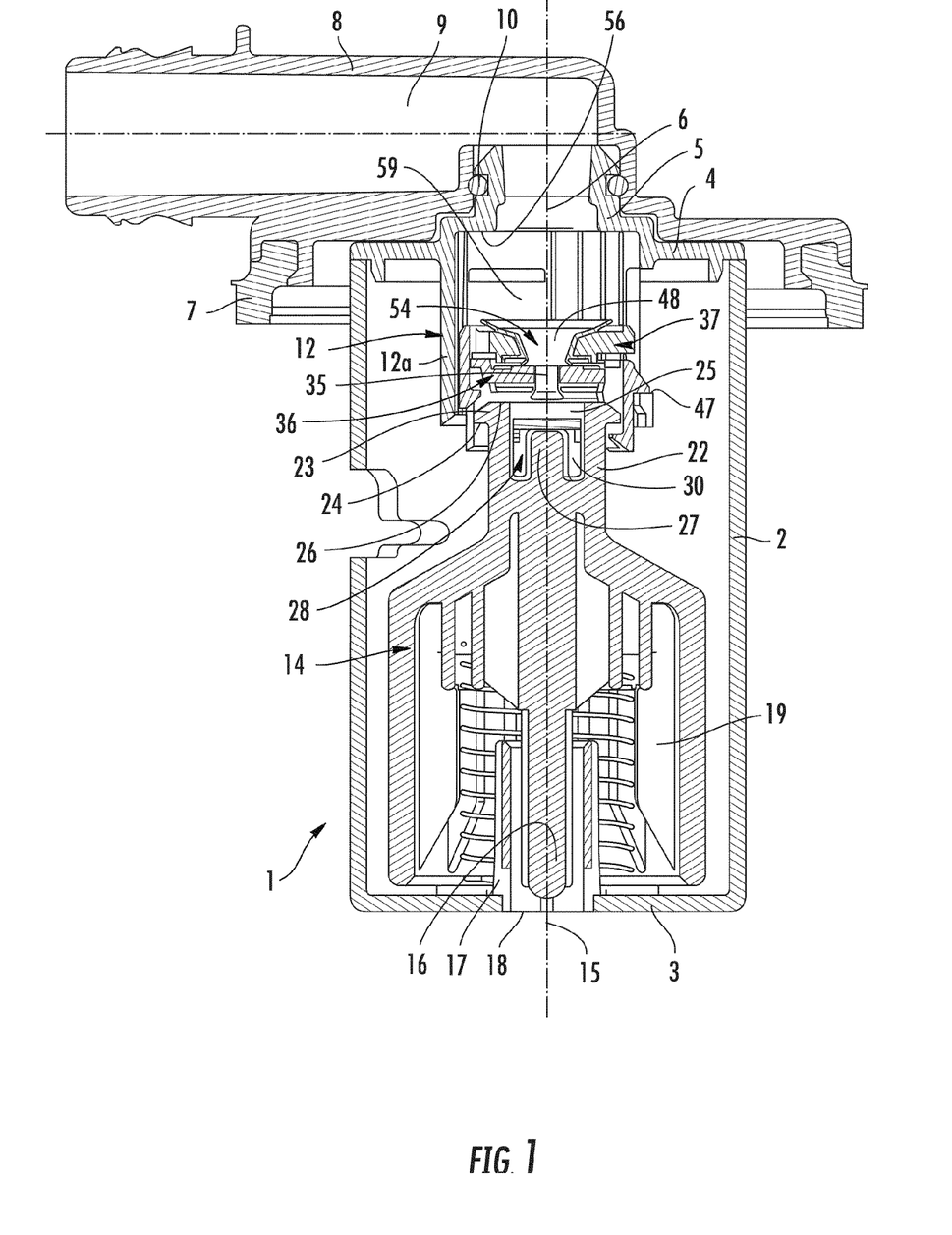
FIG. 1 a longitudinal section through a first embodiment of a vent valve with a three-stage sealing arrangement, comprising two supports, FIG. 2 a longitudinal section through the sealing arrangement as in FIG. 1, FIG. 3 a perspective view of the sealing arrangement as in FIG. 1, FIG. 4 a perspective, exploded longitudinal sectional representation of the valve from FIG. 1, FIG. 5 a perspective representation of the sealing arrangement corresponding to FIG. 3, with a different reciprocal position of the supports, FIG. 6 a longitudinal section through the sealing arrangement as in FIG. 5, FIG. 7 a perspective, longitudinal sectional view of the valve from FIG. 1, FIG. 8 a perspective view of a second embodiment of a four-stage sealing arrangement, where the total of three supports thereof are axially removed from each other, FIG. 9 a side view of the sealing arrangement from FIG. 8, wherein the supports bear against one another, FIG. 10 a side view of the sealing arrangement from FIG. 9, rotated by 90° about its central longitudinal axis, and FIG. 11 a longitudinal section taken along the line XI-XI in FIG. 8.

The sealing element 13, already mentioned above, which has an essentially circular contour, is composed essentially of a lower support 36 and an upper support 37. The supports 36, 37 are arranged after each other along the central longitudinal axis 15 and are in each case penetrated by a throughchannel 35 or 48, respectively, running coaxially to the central longitudinal axis 15. On the upper sides facing towards the vent opening 6, and on the lower sides of the support 36, 37 facing the float 14, in each case, a sealing element 45, 51, 57, 55 is arranged that is coaxial with respect to the central longitudinal axis 15. The supports 36, 37 are, in each case, movable in the direction of the central longitudinal axis 15 of the valve housing 2 relative to each other and relative to the float by a predetermined distance between a closed position and an open position. In the closed position of the lower support 36, its upper-side sealing element 51 formed as a planar seat bears against the lower-side sealing element 57 of the upper support 37, which sealing element projects in the shape of a ring lip. In the closed position of the upper support 37, its upper-side sealing element 55, which is a ring lip projecting from the upper side of the support 37, interacts with a sealing element 56 (FIG. 1) formed as a planar seat surrounding the vent opening 6. The lower-side sealing element 45 of the lower support 36, which sealing element is a projecting ring lip, interacts with the sealing element 28 present on the float 14. In each case, two sealing elements 55/56, 51/57, 45/28 assigned to each other cooperate to define an opening cross-section 61, 62, 63, the size of the successive opening cross-sections decreasing towards the float 14. Therefore, the opening cross-section 62 (sealing element pair 51/57) is smaller than the opening cross-section 61 (sealing element pair 55/56) and larger than the opening cross-section 63 (sealing element pair 45/28). The named sealing element pairs 55/56, 51/57, 45/28 form the three stages of the valve.

The lower support 36 is formed essentially from a circular disk 38 and multiple arms 39 distributed over its periphery, which are formed in the manner of wall sections curved in an arc-shaped manner, extending downwards from its edge 38a in the direction of the central longitudinal axis 15. Projections 40, protruding radially inwards, are molded onto the free ends of the arms 39. For fixing the lower support 36, it is placed on the longitudinal section 22 of the float 14, the projections 40 with angled surfaces 42 striking on the flange 23 and in the process being moved radially outwards. After the projections 40 are past the flange 23, they move radially inwards again. The projections 40 then interact with the stop face 24 of the flange 23 in the sense of an axially active undercut, whereby the support 36 is fixed on the longitudinal section 22 with axial play.

Figure 2:
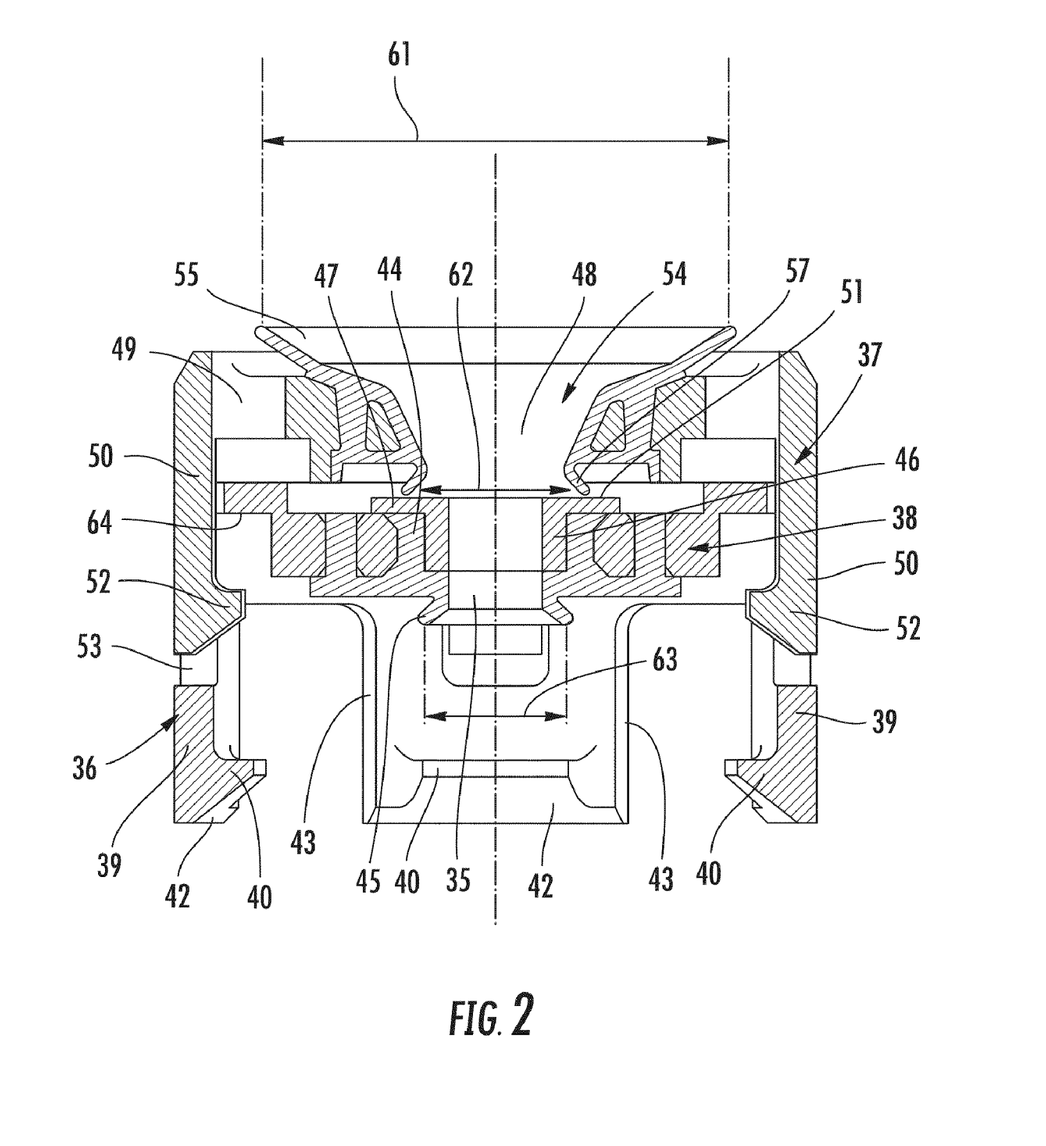
Figure 3:
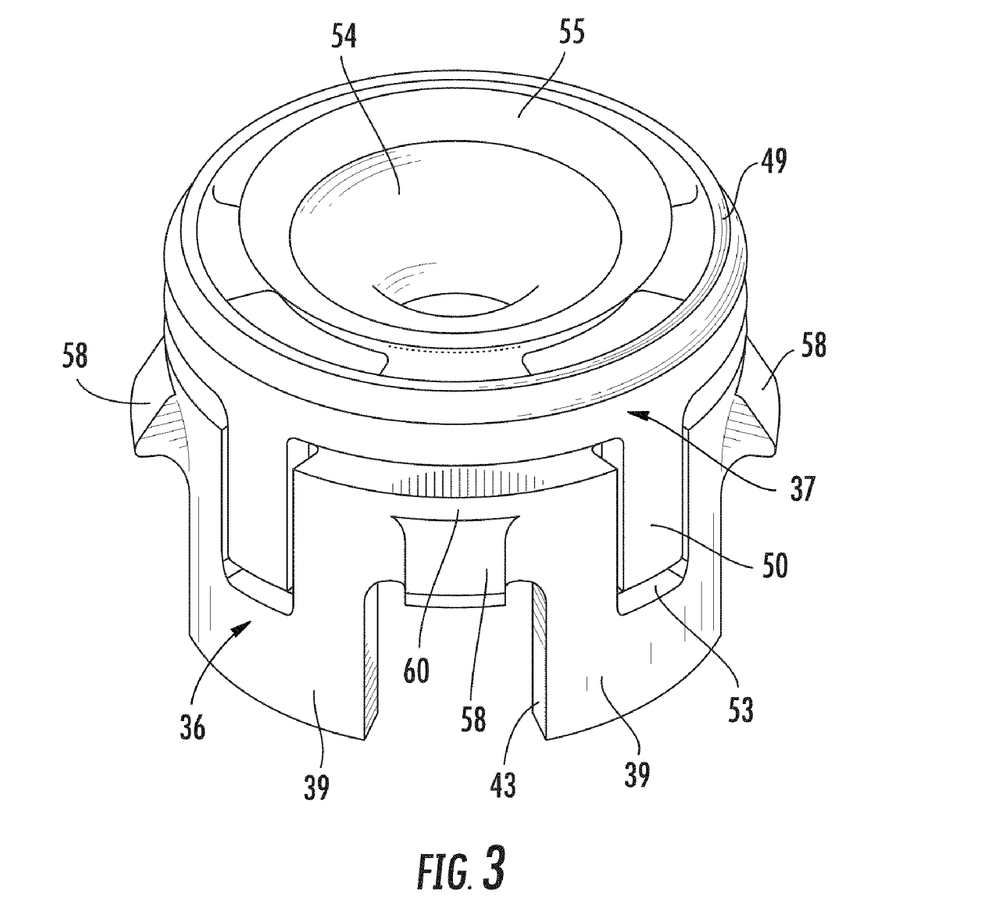

The arms 39, three in total, are separated from each other in the peripheral direction by recesses 43 and uniformly distributed in the peripheral direction. The circular disk 38 is centrally penetrated by a through channel 35 extending coaxially to the central longitudinal axis 15. An inner region (FIG. 2) of the circular disk 38, bordering on the through channel 35, is composed of an elastomer material. This material projects on the lower side of the circular disc 38 in the form of the sealing element 45 that opens in a funnel-shaped manner. The cross-sectional area of the through channel 35 is smaller than the cross-sectional area of the vent opening 6. The axial length of the arms 39 and the axial position of the projections 40 located on them are chosen such that the lower support 36 is held on the float or on its longitudinal section 22 in an axially movable manner. Therefore, when the float—assuming a closed valve—moves downwards, the sealing element 28 can move away from the sealing element 45 of the support 36, whereby the opening cross-section 63 is released. On the upper side, an essentially tubular section-shaped part 46 is inserted in the circular disk 38, which part surrounds the upper longitudinal section of the through channel 35, and on the upper face side of which a radially extending flange 47 is molded, which bears against the upper side of the circular disk 38. The upper side of the flange 47 forms the sealing element 51, which interacts with the sealing element 57 of the upper support 37.

The upper support 37 is formed essentially from a circular ring 49, on the underside of which the arms 50 are molded that extend axially or in the direction of the central longitudinal axis 15, and that are also formed like wall sections curved in an arc-shaped manner. The arms 50 are uniformly distributed over the periphery of the circular ring 49. Projections 52, which protrude radially inwards, are molded on their free ends. The projections 52 engage behind a stop face 64 (FIG. 2) facing the float 14, on the underside of the lower support 36.

Regardless of whether the sealing arrangement 13 comprises two or more supports, it is advantageous if a region 65 of a support, where the region supports a stop face 64 or is engaged from behind by a projection, is set back radially inwards at least by an extent corresponding to the thickness of an arm. In the exemplary embodiment according to FIGS. 1 through 7, this is accomplished in that windows 53, opening upwards, are present in the arms 39 of the lower support 36, where in each case, an arm 50 of the upper support 37 can be at least partially slid into the windows. The length of the arms 50 and the axial position of the projections 52 are dimensioned in the axial direction such that the second support 37 is fixed in an axially movable manner to the first support 36. Thus, it is guaranteed that the upper-side sealing element 51 of the lower support 36 and the lower-side sealing element 57 of the upper support 37 are brought into mutual contact and can be removed again from each other.

The circular ring 49 supports an elastomer element 54, which is essentially formed as a funnel opening towards the vent opening 6, the upper edge of the funnel projecting axially above the circular ring 49 forming the sealing element 55, which interacts with the sealing element 56 surrounding the vent opening 6. The lower edge of the elastomer element 54 that forms the sealing element 57, also expands in a funnel-like manner and extends beyond the lower side of the support 37.

The fixing of the sealing arrangement 13 in the cage 12 with axial mobility is accomplished in that locking projections 58, protruding radially outwards on the first support, engage in windows 59, which are present in the cage 12, and in each case, interact with the lower edge 66 (FIG. 6) of a window 59. The locking projections 58 are arranged on wall regions 60 of the first support 36, which connect two arms 39 to one another that are adjacent in the peripheral direction.

The valve described above or its sealing arrangement 13 is embodied in a three-staged manner. Naturally, more than 3 stages are also conceivable, for instance 4, 5 or even more, which, for example, are realized in the manner described above. A continuous opening of the vent opening can be attained through a larger number of stages, i.e., the pressure differences between the individual stages are lower, the more stages are present.

In the following, the mode of operation of the valve 1 is briefly explained: The vent opening 6 is closed when the float 14 moves upwards, for instance, due to an increasing level of fuel. In the closed state, the sealing element 28 or its plate 29, respectively, is pressed against the lower-side sealing element 45 of the lower support 36, the upper side of the flange 47 or the sealing element 51 is pressed against the lower-side sealing element 57 of the upper support 37, and its upper-side sealing element 55 is pressed against the sealing element 56 surrounding the vent opening 6. With absent or reduced pressure inside the tank, the weight of the float 14 is sufficient to move the sealing arrangement 13 collectively axially downwards, whereby the vent opening 6 is released. However, if during the closure of the vent opening 6, pressure builds up inside the tank, the multiple stage quality of the sealing arrangement 13, or of the valve 1, come into action. Initially, the sealing element 28 is removed from the lower support, whereupon the opening cross-section 63 is released and gas (fuel vapor/air mixture) can flow to the outside via the through channels 35, 48, which are connected to one another, and via the vent opening 6, whereby the pressure inside the tank is partially reduced. The float 14 bears with its flange 23 against the projections 40 of the lower support 36, such that this support is loaded with the weight of the float. When the pressure inside the tank has reached an appropriate limit, the force exerted by the weight of the float 14 onto the lower support 36 is sufficient to move it axially downwards, whereby the opening cross-section 62 is released. Now a substantially greater flow of gas can leave the interior of the tank via the through channel 48 and the vent opening 6. Now a pressure value is quickly attained at which the force exerted by the weight of the float 14 and the weight of the first support 36 on the second support 37 is sufficient to move the second support 37 axially downwards, too. The lower support 36 thereby bears against the projections 52 of the upper support 37. The latter is thereby also moved axially downwards, where its upper-side sealing element 55 is removed from the sealing element 56 encompassing the vent opening 6, and the opening cross-section 61 is released. Thereupon, an aeration and ventilation of the tank is again possible, whereupon pressure still remaining inside the tank can be completely relieved via the vent opening 6, whose flow cross-section is slightly smaller than the opening cross-section 61.

In the FIGS. 8 through 11 an alternate sealing arrangement 70 is shown that can be used in the type of valve described in the preceding. The sealing arrangement 70 has four stages, it comprises in total three supports, namely an upper support 71, a middle support 72 arranged below it, and lastly, arranged below this a lower support 73. The upper support 71 has a form which corresponds to that of the upper support 37 of the exemplary embodiment described above. The projections 52 present on the arms 50 engage behind a stop face 67 present on the lower side of the middle support 72. Accordingly, the same individual parts or individual parts acting in the same way are provided with the same reference numbers. The middle support 72 is formed in an approximately disk-shaped manner and is penetrated by a central through channel 74 extending coaxially to the central longitudinal axis 15 of the valve 1 or of the sealing arrangement 70. The diameter of the through channel 74 is smaller than the smallest diameter of the through channel 48 of the upper support 71. The middle support 72 comprises marginal arms 75, i.e., arms that have a radial distance to the central longitudinal axis 15 and a distance in the peripheral direction and that are formed, for instance, in the manner of arc-shaped wall segments, on the free ends of which arms, in each case, a projection 76 extending radially inwards is present, which engages behind a stop face 77 (FIG. 11) present on the lower support 73. The arms 75 have a window 78 opening upwards, are therefore U-shaped, as can be seen in the side view according to FIGS. 9 and 10.

The lower support 73 is formed similarly to the middle support 72. Its total of three arms 79 uniformly distributed in the peripheral direction are provided on their free ends with a projection 80 extending radially inwards, which in the assembled state engages behind the flange 23 of the float 14. Windows 82 opening upwards are present in the arms 79. A projection 83, bridging the windows 82, is molded onto the outer side of the arms 79 where in the assembled state said projection projects into a window 59 present in the cage 12 and interacts with the lower edge 66 (FIG. 4, 7) of this window in the sense of a stop. Those regions of a support 72, 73 which are engaged from behind by the arms 50, 75 of a support 71, 72 arranged above, or by the projections 52, 76 molded onto the arms, are set back radially inwards. In the case of the middle support 72, these are the regions 85 extending in the peripheral direction between the arms 75, or in the case of the lower support 73, the regions 86. The extent by which the regions 85, 86 are offset radially inwards, corresponds approximately to the thickness of the arms 50 or the arms 75. This embodiment is advantageous in that the sealing arrangement 70, as well as the sealing arrangement 13 described above, have a small overall width and a small outer circumference and correspondingly require a small installation space.

The upper-side sealing element 86 of the middle support 72 interacting with the lower-side sealing element 57 of the upper support 71, is formed by a region of the upper side of the support 72 surrounding the through channel 74 and its upper-side outlet opening, respectively. On the lower side of the support 72, an elastomer element 87 is arranged that has an edge projecting downwards surrounding the through channel 74 or its lower-side outlet opening, which edge forms a sealing element 88. The sealing element 88 interacts with an upper-side sealing element 89 of the lower support 73. The sealing element 89 is formed by a surface region that surrounds the central through channel 90 of the lower support 73 or its upper-side outlet opening. On the lower side of the lower support 72, an elastomer element 92 is also arranged at which also an edge projecting downwards, which surrounds the through channel 90 or its lower-side outlet opening, and forms a sealing element 93 interacting with the sealing element 28 of the float 14. The sealing elements 55/56, 57/86, 88/89 and 93/28 interacting with one another, their size decreasing in the direction towards the float 14. The four-stage mode of operation of a valve equipped with the sealing arrangement 70 corresponds to that of the valve operating in a three-stage manner described above, except that due to the additional stage, it is optimized especially with regards to a fast re-opening after the development of pressure inside the tank.

While preferred embodiments have been shown and described, those skilled in the art will recognize that changes and modifications may be made to the embodiments without departing from the scope and spirit of the invention. For example, specific styles and dimensions of various elements of the illustrated embodiments and materials used for the elements may be altered to suit particular applications or industry regulations. It is intended that all such changes and modifications as such fall within the scope of the appended claims and their equivalents.

The invention claimed is:

1. Vent valve for a fuel tank of a motor vehicle, the vent valve comprising:
    a housing having a vent opening at an upper region of the housing;
    a cage attached to the housing at the upper region adjacent the vent opening;
    a float located in the housing movable along a central longitudinal axis of the valve housing; and
    a sealing arrangement on an upper side of the float for selectively closing in one step the vent opening upon rising fuel level in the housing and configured for stage reopening operation.

2. Vent valve according to claim 1, wherein the sealing arrangement includes several coaxially arranged supports along the central longitudinal axis, each of the supports being penetrated by a channel running coaxially to the central longitudinal axis, the channel including a plurality of openings in the supports, on an upper side of each support facing towards the vent opening and on a lower side of each support facing the float, a sealing element is located coaxially to the central longitudinal axis, each support being movable relative to each other support and relative to the float, in the direction of the central longitudinal axis of the valve housing, by a predetermined distance between a closed position and an open position, in the closed position the sealing element on the support upper side bears against a counter-sealing element comprising one of the sealing element on an adjacent support or a sealing element surrounding the vent opening, the sealing element on the lower side of the lowest support interacting with a sealing element fixed to the float, two of the sealing elements cooperating to surround one of the openings, each of the openings having a cross-section with a size that decreases respectively, towards the float, wherein when the sealing arrangement is in a position so that the vent opening is open the cooperating sealing elements are separated from each other.

3. Vent valve according to claim 2, wherein an adjacent two of the supports are connected to one another via multiple arms extending from one of the supports beyond the lower side in the direction of the central longitudinal axis with a radial distance to the central longitudinal axis, a projection being located at a free end of each arm which engages behind a stop face on the other of the supports pointing towards the float.

4. Vent valve according to claim 3, wherein on the other of the supports a region engaged by a projection is recessed radially inwards at least by a dimension corresponding to the thickness of the arm.

5. Vent valve according to claim 3, wherein one of the arms is penetrated by a window opening into the upper side of one of the supports, where the window receives at least the free end of one of the arms of the other of the supports arranged above the one of the supports.

6. Vent valve according to claim 5, wherein on the lowest one of the supports the multiple arms extend in the direction of the central longitudinal axis beyond a lower side of the lowest one of the supports and that have a radial distance to the central longitudinal axis, the several arms holding the support on the float in an axially movable manner.

7. Vent valve according to claim 6, wherein each of the several arms on the lowest one of the supports via a projection arranged on a free end and that protrudes radially inwards engages from behind a stop face on the float facing away from the vent opening of the valve housing.

8. Vent valve according to claim 7, wherein the stop face on the float is formed by an under side of a flange present on a free end of a central, radially narrowed longitudinal section of the float.

9. Vent valve according to claim 1, wherein the sealing arrangement includes a plurality of supports arranged vertically, a sealing element on a lower side of a lowest of the supports interacts with a sealing element on an upper side of the float.

10. Vent valve according to claim 9, wherein the sealing element on the upper side of the float is axially movable relative to the float.

11. Vent valve according to claim 1, wherein the cage is formed from an essentially cylindrical peripheral wall, penetrated by at least one window extending axially and over a part of the cage circumference.

\* \* \* \* \*

UNITED STATES PATENT AND TRADEMARK OFFICE
CERTIFICATE OF CORRECTION

PATENT NO. : 8,001,991 B2  
APPLICATION NO. : 11/869846  
DATED : August 23, 2011  
INVENTOR(S) : Theissler et al.

It is certified that error appears in the above-identified patent and that said Letters Patent is hereby corrected as shown below:

Column 8, line 12 after the words "configured for", please insert --at least three- --.

Column 8, line 45 please delete "behind".

Signed and Sealed this
Fourth Day of October, 2011

David J. Kappos
*Director of the United States Patent and Trademark Office*